US008850716B2

(12) United States Patent
Whitehead et al.

(10) Patent No.: US 8,850,716 B2
(45) Date of Patent: Oct. 7, 2014

(54) HEATED INSOLE REMOTE CONTROL SYSTEMS

(75) Inventors: Ian Whitehead, Concord, MA (US); James K. Lynch, Bedford, MA (US)

(73) Assignee: Schawbel Technologies LLC, Bedford, MA (US)

( * ) Notice: Subject to any disclaimer, the term of this patent is extended or adjusted under 35 U.S.C. 154(b) by 643 days.

(21) Appl. No.: 13/166,351

(22) Filed: Jun. 22, 2011

(65) Prior Publication Data

US 2012/0159811 A1    Jun. 28, 2012

Related U.S. Application Data

(60) Provisional application No. 61/427,509, filed on Dec. 28, 2010.

(51) Int. Cl.
A43B 7/02 (2006.01)
A43B 3/00 (2006.01)
A43B 7/04 (2006.01)

(52) U.S. Cl.
CPC ............ *A43B 3/0015* (2013.01); *A43B 7/02* (2013.01); *A43B 7/04* (2013.01)
USPC ............................................................ 36/2.6

(58) Field of Classification Search
CPC .......... A43B 7/04; A43B 7/02; A43B 3/0015; A43B 3/0005
USPC ................................................................ 36/2.6
See application file for complete search history.

(56) References Cited

U.S. PATENT DOCUMENTS

| 5,882,106 A * | 3/1999 | Galli .............................. 362/259 |
| 5,956,866 A * | 9/1999 | Spears .............................. 36/2.6 |
| 7,985,502 B2 * | 7/2011 | Abe et al. ....................... 429/200 |
| 8,510,969 B2 * | 8/2013 | Luo .................................. 36/2.6 |
| 2007/0039201 A1 | 2/2007 | Axinte |
| 2008/0016715 A1 | 1/2008 | Vickroy |
| 2008/0083720 A1 * | 4/2008 | Gentile et al. ................. 219/211 |
| 2008/0197126 A1 | 8/2008 | Bourke |
| 2009/0013554 A1 * | 1/2009 | Macher et al. ................... 36/2.6 |
| 2010/0192406 A1 * | 8/2010 | Au ..................................... 36/2.6 |

FOREIGN PATENT DOCUMENTS

CN    201976877 U    9/2011

* cited by examiner

*Primary Examiner* — Ted Kavanaugh
(74) *Attorney, Agent, or Firm* — Brown Rudnick LLP

(57) ABSTRACT

A remote control wireless heated insole system in which address data identifying specific insoles to be heated is provided. Once the heating process is initiated, periodic repeated control signals are generated to cause heating of the insoles.

16 Claims, 3 Drawing Sheets

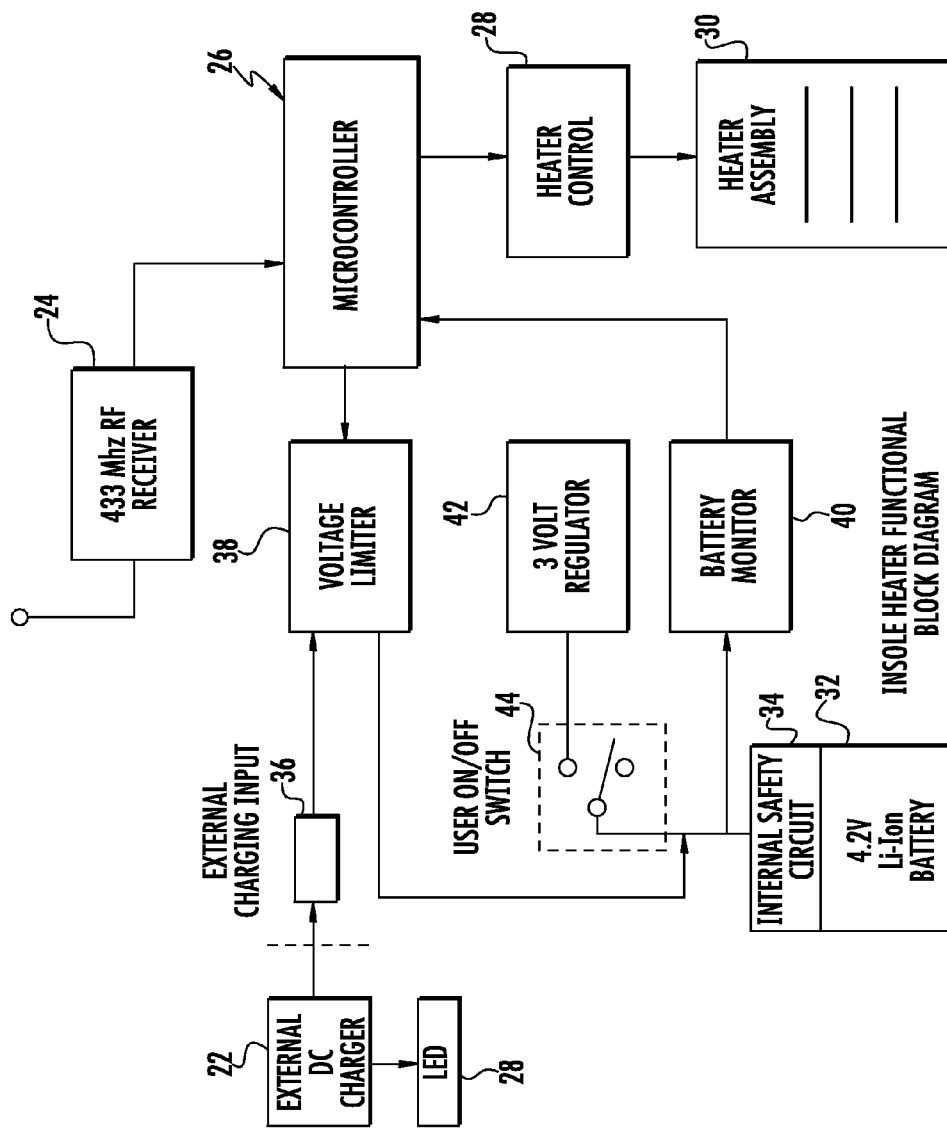

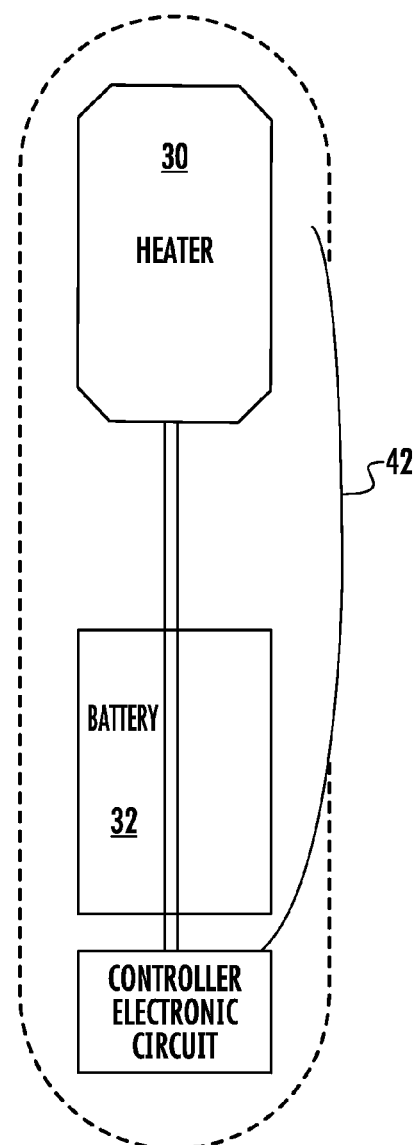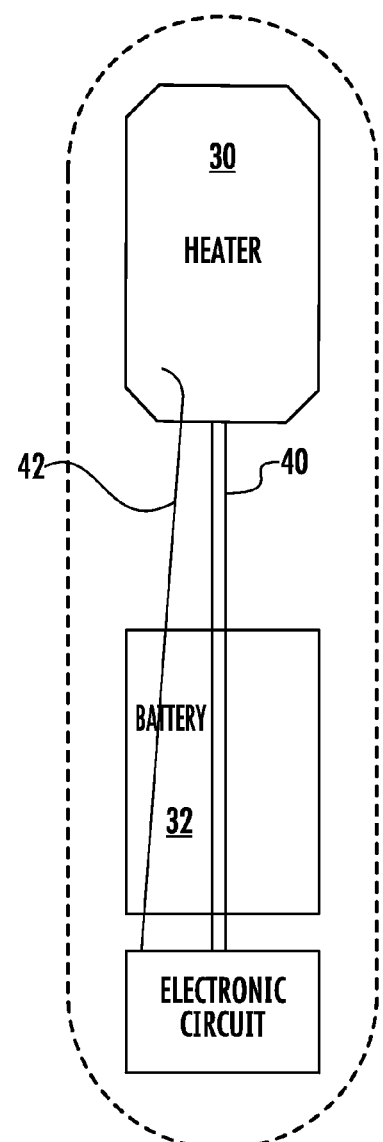
FIG. 3A
FIG. 3B
(PRIOR ART)

HEATED INSOLE REMOTE CONTROL SYSTEMS

RELATED APPLICATIONS

This application is based on Provisional Patent Application Ser. No. 61/427,509, filed Dec. 28, 2010, the contents of which are incorporated herewith and the priority of which is claimed.

BACKGROUND OF THE INVENTION

Field of the Invention

The present invention relates to a remotely controlled heated insole for footwear and to an improved method of control of such heated insoles that provides a more reliable means of ensuring that the temperature desired by the user is realized.

BRIEF DESCRIPTION OF THE INVENTION

The present invention is directed to heating insoles of footwear, and improving the ability to realize desired temperatures through wireless control signals. Heated insoles are intended to aid a user in withstanding cold weather by providing supplementary heat in the case where normal body heating is not enough or when additional heat is desired to be more comfortable. When an extremity of the body starts to become cold, the body's natural physiological response of vasoconstriction occurs in which the nervous system restricts blood flow to the cold extremity in an effort to keep the rest of the body warm. It is well known that frostbite and other cold related injuries occur first in fingers and toes due to vasoconstriction and keeping these extremities warm will help insure survival or at minimum a more pleasurable outdoor experience.

Heated insoles are a key component to preventing injury in cold weather and are well known to hunters and outdoorsmen as standard survival gear while in the woods or forest. A problem exists however in the control of such insoles as often the insole temperature needs to be adjusted to accommodate different conditions and comfort levels. Standard temperature adjustment methods require the user needs to remove his or her boot to gain access to the insole in order to make desired adjustments. Not only is this procedure time consuming but removing the user's foot from the boot to gain access to the insole exposes the foot to the cold conditions. This adjustment procedure undoubtedly lowers the foot temperature even further thereby further increasing risk or injury.

An improved method of control has been developed however utilizing a hand held remote control system which employs a transmitter unit external to the insole and a receiver unit located within the insole assembly inside the boot. The desired heat adjustment is then performed by the user selecting a heat setting on the hand held remote unit which is then wirelessly transmitted to the receiver unit located within the heated insole assembly. Although this improved method of control is an improvement, the design requirements for a proper fitting heated insole yields conditions not optimum for wireless control as will be pointed out in the following discussion.

Heated insoles are placed in a shoe with its bottom surface against the bottom of the shoe and the upper surface against the user's foot when in use. Antenna placement within the insole is positioned parallel to the ground surface and also to the foot placed above it. A problem exists in the prior art however in which this restrictive antenna positioning tends to prohibit the reception of information transmitted from the hand held unit to the receiver unit due to the signal grounding effect produced by the earth's surface on the bottom and the user's foot on top of the antenna. This grounding effect is often severe enough that it inhibits information from the transmitter to the receiver unit, therefore preventing any heating adjustments to be made.

Additionally, the location of the RF receiver, inside shoes, adjacent to the ground requires special consideration to overcome signal loss. Prior art radio controlled insoles include the wire antenna along the midline of the insole. This has been problematic because signal strength is affected. The inventors realized that much of the transmitted signal is blocked by the ground from reaching the receiver antenna located in the insole. The foot and body of the wearer also tend to block the signal. One improvement of this invention for the receiver antenna is to locate it more advantageously for signal reception, for instance, near the outer margin of the insole. Reception is materially improved with such an antenna.

The present invention includes a heated insole device that uses radio frequency communication with an improved transmission system to control the desired insole temperature. The present invention uses a standard frequency of 433 Megahertz but may be used with other frequencies, such as the common 2.4 Gigahertz.

As described above, the manufacturing of an insole product requires that the device itself be relatively flat and fit within a standard shoe or boot. This requirement forces the necessary power source, control methods and communication means to all exist within the confines of the shoe and lie in a flat plane parallel to the earth's surface. Although this space limitation is achievable with good design practice, radio communication suffers largely due to the horizontal orientation of the antenna, its proximity to the earth and the person standing above it. Furthermore, transmission at the frequencies described above is dictated by governing authorities to be a limited transmission of a just a few seconds per hour, so the notion of continuous transmission, if even in the power budget, would be prohibited.

The present invention also discloses a system and method of communication that helps to ensure that user commands are more effectively transmitted by providing a plurality of transmissions at specific spaced intervals of time. By providing discrete, timed transmissions after the user temperature control has been initiated, the probability of transmissions coinciding with the user taking a step and lifting his foot off the ground is increased. The timed control signal may be initiated by the remote or may be controlled by a microprocessor within the insole. With the foot off the ground, the distance between the horizontally placed antenna within the insole and the earth's surface is greatly increased, thus increasing the reception range for the insole. A secondary action that occurs while a foot is in the air is that the pressure of the person wearing the shoe is relieved from the insole, decompressing the foam some measurable amount between the antenna and the person. This decompression although small, tends to increase the transmission success thus providing a better user experience.

For example, it is well known that an adult person walks at a rate of three miles per hour, which equates to four feet per second with a stride length of about eighteen inches. This stride and pace suggests approximately 2.6 steps be taken every second.

Since bipedal humans alternate feet while walking, this suggests that each foot is lifted off the ground every 1.3 seconds or approximately once per second.

Knowing that each foot is off the ground once per second for almost a second, allows more robust communication by providing transmissions that occur while the foot position is in the air and not on the ground surface. Transmissions every half second will insure some of the broadcasted signal will be simultaneous with the foot being in the air, thus delivering the intended command to the insole device. Other time periods may be chosen in accordance with prevailing governmental regulation.

For skiers or snowboarders who use this invention, the position of the foot also shifts from purely horizontal to some vertical orientation, such as when a skier uses edges or a boarder shifts positions. Still further, the heating operation may occur while the user is in a lift chair which also alters the orientation of the sole.

Transmitting the sequence of coded signals periodically for a short period of time after the initiation of the process to heat the insole increases the ability of the user to more effectively communicate the heating instructions to the insole.

The instant invention includes a battery powered electrically heated pair of insoles that are in radio communication with a key fob R/F transmitter. The battery is a lithium ion polymer battery and is provided with a self-contained conventional protective circuit. The transmitter sends out an encoded signal to be received and decoded by a unique pair of insoles. The insole has an on/off switch. This switch may be placed in the on position before the insole is placed inside the shoe.

When the switch is placed in the on position, the insole does not produce heat, but the R/F system in the insole is ready to receive commands from the key fob transmitter. Each insole has an on/off switch and may have a unique code permitting selected insoles to be heated. When both switches are on, both insoles will respond to the key fob transmitter. The user may utilize the key fob transmitter to select among; no heat, medium heat, and high heat by pressing the appropriate button on the key fob transmitter. Settings other than discrete may be used.

When a heat setting is selected on the key fob transmitter, the RF receiver in the insole detects the signal and, if intended for a specific insole, activates the process therein. The microprocessor senses the temperature near the heater, and if the temperature is too low for the selected setting, current flows from the battery to the heater until a thermistor reaches a predetermined temperature. The thermistor generates a signal which is sent to the microprocessor. The microprocessor controls the flow of current to achieve and maintain the desired temperature until the user selects another setting. Other methods of controlling the heat in the insole may be employed.

BRIEF DESCRIPTION OF THE DRAWINGS

FIG. 2 is a block diagram of the electronic circuit within the insole; and

FIGS. 3A and 3B are partial sectional views of the insole showing the location of the antenna in the present invention and in the prior art.

DETAILED DESCRIPTION

Figure 1:
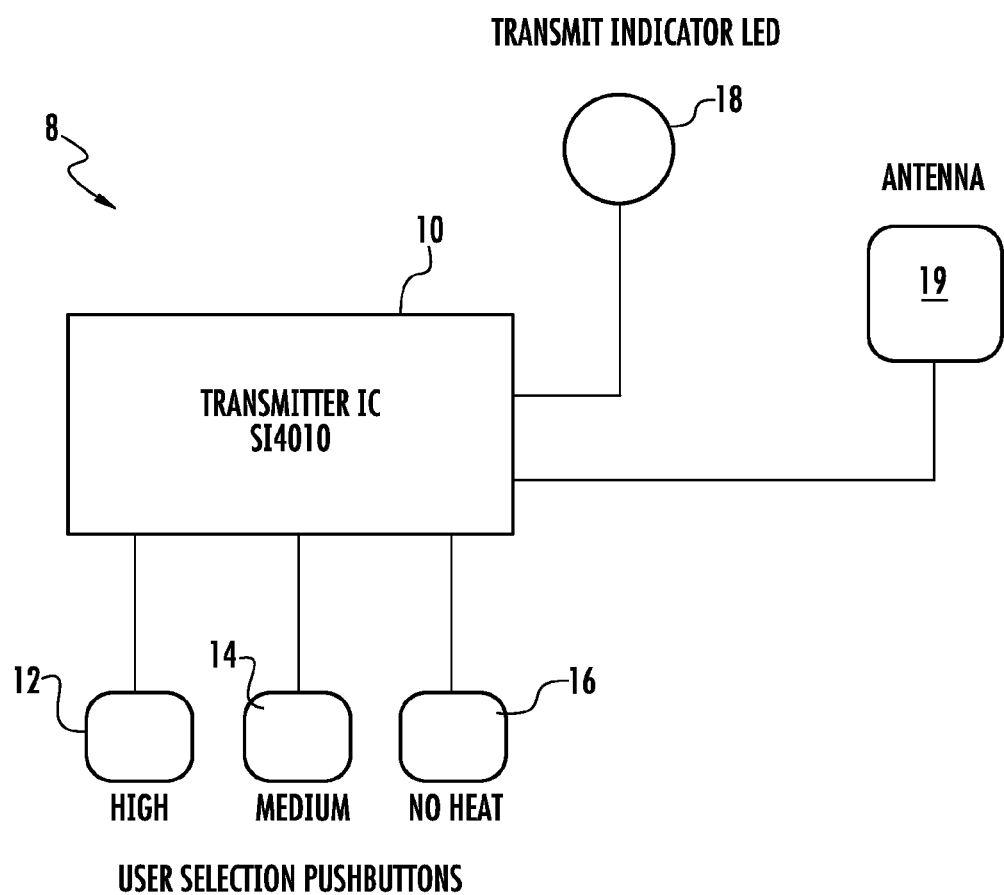
FIG. 1 is a block diagram of the transmitter unit.

FIG. 1 is a block diagram showing the transmitter 10 of this invention. The transmitter comprises an integrated circuit S14010 which is connected to a plurality of push buttons 12, 14 and 16. The push buttons generate signals to cause high, medium and no heat conditions, respectively, to be generated within the insole. The user selects a push button to be activated in order to control the temperature within the insole.

An LED 18 may be connected to the transmitter to indicate that the transmitter is transmitting and/or to indicate that the transmitter is on and capable of transmitting. An antenna 19 connected to the transmitter wirelessly transmits electronic signals generated in transmitter 10 to the electrical circuit within the insole.

The transmitter 10 decodes the user command by determining which of the push buttons is selected, and the transmitter provides a burst of four packets of information or electrical signals with each packet consisting of an address and data. The packet length, by example, is 120 ms in length and the entire four packets takes approximately 512 ms to transmit. To ensure the command is received properly, the four packet sequence is repeated every 15 seconds over the next minute for a total of 20 packets. This is within current FCC regulations.

Referring to FIG. 2, there is shown an electrical circuit located within the insole. Transmitted data packets are received and decoded through receiver 24 and connected to microcontroller 26. The decoded signal is sent to the microcontroller for processing, which creates a control signal for heater control 28 to achieve the desired temperature condition for the insole. Additionally, the address data identifies the insole to be controlled. The heater control 28 is connected to heater assembly 30 located within the insole to heat the insole to a desired temperature. The heater assembly also includes a temperature sensing device such as a thermistor to determine the real time temperature of the heated insole to determine if further heating is required under control of microcontroller 26.

The microcontroller 26 and heater assembly 30 are powered by a 4.2 volt lithium ion polymer battery 32 having an internal safety circuit 34.

The lithium battery 32 is recharged by using an external DC charger 22 connected to input jacks 36 located within the insole. The charging is thus controlled outside of the insoles. A voltage limiter 38 is connected to the output of the external charging input to ensure that the voltage supplied to recharge battery 32 is maintained below a certain level. Battery charging is achieved by using the external charger to control voltage and current to the batteries, and the voltage limiter 38 provides fine voltage control to optimize battery charging. An LED 23 is provided with the external DC charger 22 to display the battery status so it can be determined when the battery has been sufficiently charged, and the external charger may be unplugged from the insoles. A three volt regulator circuit 42 is provided to ensure that the microcontroller and heater assembly properly operate. The control circuit for the system shown in FIG. 2 includes voltage regulator 42 to control the voltage at microcontroller 36.

Locating the protective circuit 34 within the battery is an improvement over having a protective circuit outside of the lithium battery. Providing the protective circuit within the lithium battery is important because if the battery leads short circuit, a hazard will be prevented by having the protective circuit therein. If the protective circuit is remote from the lithium battery, damage from such short circuit to the battery will not be prevented.

In normal use, the user sets the on/off switch 44 to the on position in the insole to allow the battery voltage to control the electronic circuitry therein. The microcontroller 26 receives a command signal from RF receiver 24 and decodes the information to see if the unique address matches that of the insole. If such a match is found, the microcontroller then determines from the command signal the heat setting which is desired.

Once such heat setting is decoded, the microcontroller 26 then commands the control circuit 28 to turn on the heater and maintain a desired heating set point. This continues until the user switches the on/off switch to off or the battery power is exhausted. Additionally, there is a heat control (No Heat) in the transmitter which also can turn off the heating unit.

The instant invention includes a battery powered electrically heated pair of insoles that are in radio communication with the key fob R/F transmitter 8 (see FIG. 1). The transmitter 10 sends out an encoded signal that may be received and decoded by a unique pair of insoles. When the switch in the insole is on, the insole does not produce heat, but the R/F system in the insole is ready to receive commands from the key fob transmitter. Each insole has its own on/off switch. When both switches are on, both insoles may respond to the key fob transmitter depending on the address data. The user may utilize the key fob transmitter 8 to select among; no heat, medium heat, and high heat by pressing the appropriate button on the key fob transmitter 8.

When a heat setting is selected on the key fob transmitter 8, the RF receiver 24 in the insole detects the signal and activates microprocessor 26. The microprocessor 26 senses the state of a temperature measuring thermistor located near the heater, and if the temperature is too low for the selected setting, current flows from the battery 32 to the heater 30 until the thermistor reaches a desired temperature. Then, the microprocessor 26 reduces the flow of current to keep the predetermined temperature. The temperature is maintained until the user selects another setting.

The location of the RF receiver, inside shoes, adjacent to the ground requires special consideration to overcome signal loss. Prior art radio controlled insoles locate the wire antenna 40 along the midline of the insole (see FIG. 3b). This has been problematic because signal strength is not sufficient. Much of the transmitted signal is blocked by the ground from reaching the receiver antenna located in the insole. The foot and body of the wearer also tend to block the signal. The receiver antenna 42 of this invention is located near the outer margin of the insole (see FIG. 3a).

When the user is ready to recharge the batteries, the insoles may be removed from the shoes and the switches are placed in the off position. In the alternative, the charging jacks may be available from outside the footwear by suitable protective waterproofing of such jacks.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. An improved system for remotely causing an insole of an item of footwear to be heated, said system comprising:
   a remote transmitter transmitting a wireless control signal initiating a process to increase the temperature in said insole to adjust the temperature of a heating element in said insole, said wireless control signal comprising a series of electronic signals,
   an electronic circuit contained within said insole, said electronic circuit comprising
   a receiver contained to receive said wireless control signal,
   a microprocessor,
   said microprocessor comprising means to sense a real time temperature of said insole,
   said microprocessor generating control signals to cause said heating element in said insole to be adjusted to achieve said desired temperature, said system automatically generating periodic repeated control signals upon initiating said process to control heating of said insole in response to said control signal.

2. An improved system according to claim 1, wherein said periodic signals are initiated by a single control signal generated in said transmitter.

3. An improved system according to claim 2, wherein said single control signal is triggered by a switch in said transmitter.

4. An improved system according to claim 3, wherein said switch is depressed once to initiate said heating process.

5. An improved system according to claim 1, wherein said periodic signals are generated by said microprocessor upon receipt of said control signal from said remote transmitter.

6. An improved system according to claim 1, wherein said periodic signals are generated for less than a five minute total period of time.

7. An improved system according to claim 5, wherein said periodic signals are generated for less than a two minute total period of time.

8. An improved system according to claim 6, wherein said periodic signals are generated approximately every fifteen seconds.

9. An improved system according to claim 1, wherein said insole comprises a flat rechargeable ion lithium battery, said electronic circuit further comprising a voltage regulator connected to said lithium battery to regulate the voltage of said lithium battery.

10. An improved system according to claim 9, wherein said electronic circuit in said insole further comprising a voltage limiter connected to said lithium battery.

11. An improved system according to claim 1, further comprising housing means in said insole for said lithium battery, said housing means enabling said lithium battery to be easily removed from said insole, and a replacement lithium battery to be placed in said housing to provide power for said insole.

12. An improved system according to claim 1, further comprising an antenna in said electronic circuit, said antenna located in the periphery of said insole.

13. An improved system according to claim 1, wherein said wireless control signal comprises unique insole identification data and control data, said insole to be heated identified by said insole identification data.

14. An improved system according to claim 13, wherein said unique insole identification data comprises data to identify more than one insole to be heated.

15. An improved system according to claim 1, further comprising heated insoles powered by ion lithium polymer batteries, said batteries having safety circuits located within said battery, and safety circuits located between battery poles and connecting wires.

16. An improved system according to claim 15, wherein said batteries comprise input jacks connected to recharging sources outside of said insoles.

* * * * *